(12) United States Patent
Beechey et al.

(10) Patent No.: US 8,896,982 B2
(45) Date of Patent: Nov. 25, 2014

(54) ELECTRODES FOR ELECTRONIC WEAPONRY AND METHODS OF MANUFACTURE

(75) Inventors: Thomas W. Beechey, Scottsdale, AZ (US); Michael J. Campbell, Scottsdale, AZ (US); Mark A. Hanchett, Phoenix, AZ (US)

(73) Assignee: TASER International, Inc., Scottsdale, AZ (US)

( * ) Notice: Subject to any disclaimer, the term of this patent is extended or adjusted under 35 U.S.C. 154(b) by 571 days.

(21) Appl. No.: 12/983,163

(22) Filed: Dec. 31, 2010

(65) Prior Publication Data

US 2012/0170167 A1     Jul. 5, 2012

(51) Int. Cl.
*H05C 1/06* (2006.01)
*A01K 15/02* (2006.01)
*F41H 13/00* (2006.01)

(52) U.S. Cl.
CPC .......... *A01K 15/029* (2013.01); *F41H 13/0025* (2013.01)
USPC ............ 361/232; 102/439; 102/502; 102/504

(58) Field of Classification Search
USPC ............................. 361/232; 102/439, 502, 504
See application file for complete search history.

(56) References Cited

U.S. PATENT DOCUMENTS

| | | | |
|---|---|---|---|
| 2,719,957 A * | 10/1955 | Abbott | 439/411 |
| 5,100,346 A * | 3/1992 | McCardell | 439/595 |
| 5,698,815 A * | 12/1997 | Ragner | 102/502 |
| 5,782,761 A | 7/1998 | Gusakov | |
| 5,786,546 A * | 7/1998 | Simson | 102/438 |
| 5,831,199 A * | 11/1998 | McNulty et al. | 89/1.11 |
| 6,461,357 B1 * | 10/2002 | Sharkey et al. | 606/45 |
| 6,505,082 B1 | 1/2003 | Peterfeso | |
| 7,100,514 B2 | 9/2006 | LeBourgeois | |
| 7,434,517 B1 | 10/2008 | Linker | |
| 7,444,939 B2 | 11/2008 | McNulty | |
| 7,444,940 B2 | 11/2008 | Kapeles | |
| 7,600,337 B2 | 10/2009 | Nerheim | |
| 7,602,597 B2 * | 10/2009 | Smith et al. | 361/232 |
| 7,984,676 B1 | 7/2011 | Gavin | |
| 8,441,771 B2 | 5/2013 | Hinz | |
| 2003/0073338 A1 * | 4/2003 | Sumer et al. | 439/368 |
| 2005/0033397 A1 | 2/2005 | Aisenbrey | |
| 2009/0177230 A1 * | 7/2009 | Henderson et al. | 606/246 |
| 2010/0315755 A1 | 12/2010 | Gavin | |
| 2010/0315756 A1 | 12/2010 | Gavin | |
| 2012/0019975 A1 | 1/2012 | Hanchett | |

* cited by examiner

*Primary Examiner* — Zeev V Kitov
(74) *Attorney, Agent, or Firm* — William R. Bachand

(57) ABSTRACT

A deployment unit for an electronic control device (ECD) used as a weapon provides a current from a signal generator of the ECD through tissue of a human or animal target. The deployment unit includes a housing, an interface, a filament, and an electrode. The interface couples the housing to the signal generator. The filament includes a first end coupled to the interface for receiving the current and comprises a second end. The filament conducts the current for inhibiting voluntary movement by the target. The electrode, stored in the housing prior to deployment, mechanically couples the filament to the target when deployed. The electrode includes an assembly of a first part and a second part that after assembly cooperate to bind the second end of the filament to the electrode.

19 Claims, 11 Drawing Sheets

ELECTRODES FOR ELECTRONIC WEAPONRY AND METHODS OF MANUFACTURE

FIELD OF THE INVENTION

Embodiments of the present invention relate to electronic weaponry, electronic control devices, deployment units for electronic weaponry, electrodes used in deployment units, and methods of manufacturing such electrodes that provide a current through a human or animal target.

BACKGROUND OF THE INVENTION

Conventional electronic control devices (ECDs) include hand-held launchers that launch one or more probes, also called darts, to strike a human or animal target. In one implementation, a current sourced by the launcher is conducted through the probe. A tether wire conducts the current from a signal generator in the launcher to the probe. The circuit or path through the target includes the signal generator, one or more tether wires and one or more probes.

Conventional techniques to attach the tether wire to the probe may involve a considerable amount of manual labor and/or subject the tether wire to stress that may cause the wire to break immediately or break in use due to the stress of propelling the probe to the target.

Improved techniques to attach the tether wire to the probe are desirable, for example, to improve reliability.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
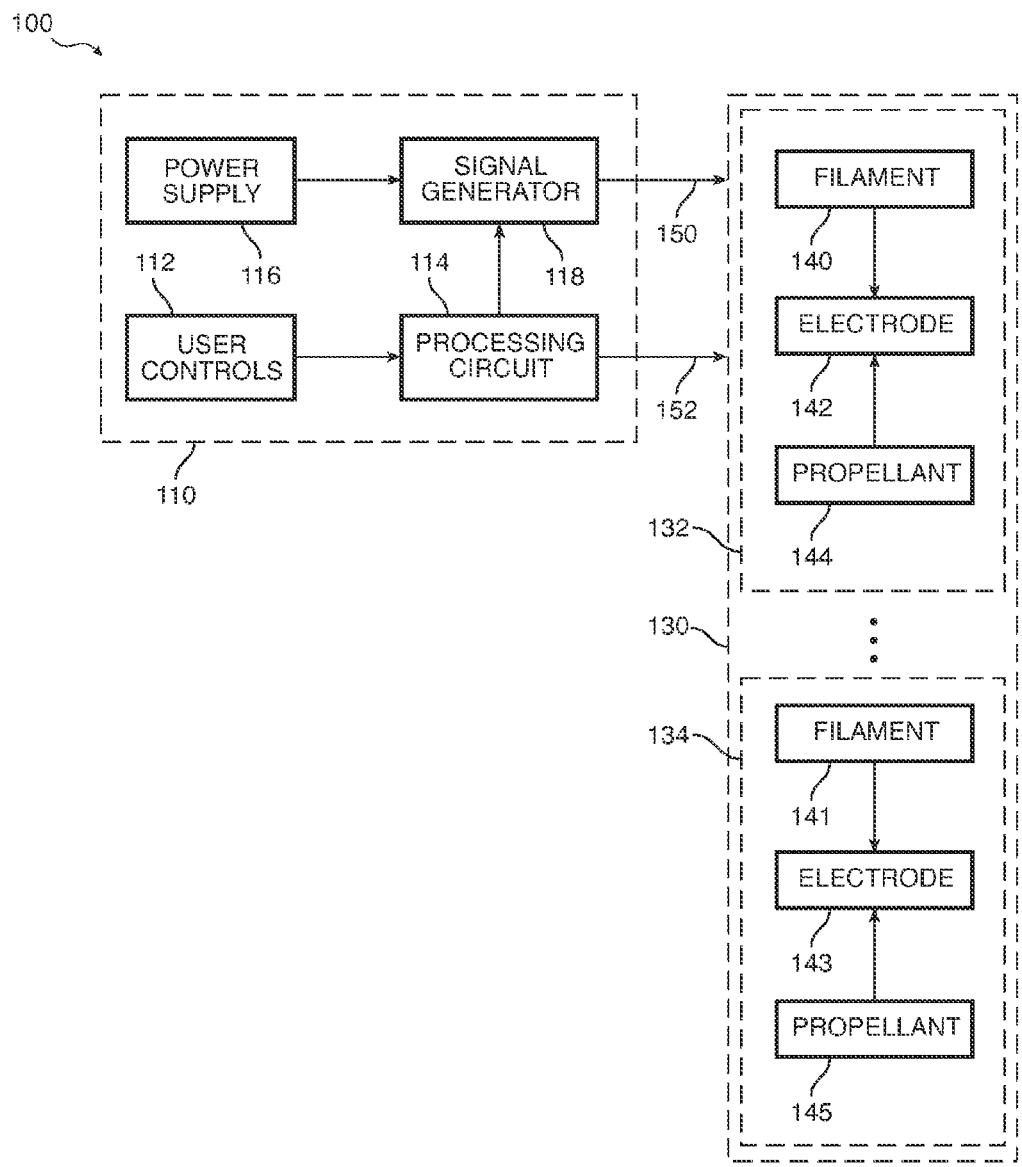
FIG. 1 is a functional block diagram of an electronic weapon according to various aspects of the present invention.

An electronic weapon, according to various aspects of the present invention, delivers a current through a human or animal target to interfere with locomotion by the target. An important class of electronic weapons launch at least one tethered electrode (e.g., dart, probe) toward a target to position the electrode in or near target tissue. A respective filament (e.g., wire with or without insulation) extends from the electronic weapon to each electrode at the target, thereby tethering the electrode to the electronic weapon. One or more electrodes may form a circuit through a target. The circuit conducts the stimulus signal. The circuit's return path may be through ground, through one or more additional tethered electrodes, or through a conductive path (e.g., liquid, plasma) formed by the electronic weapon to the target. The electronic weapon provides a stimulus signal (e.g., current, pulses of current) through, inter alia, the filament, the electrode, and the target to interfere with locomotion by the target. Interference includes causing involuntary contraction of skeletal muscles to halt voluntary locomotion by the target and/or causing pain to the target to motivate the target to voluntarily stop moving.

Conventional stimulus signals may be used. For example, a stimulus signal may comprise about 19 current pulses per second at a duty cycle less than $1/400$, repeated for a period of from 5 to 30 seconds to facilitate arrest of the target or escape from the target.

An electronic weapon, according to various aspects of the present invention, may include a launch device and one or more field replaceable deployment units mounted to the electronic weapon. Each deployment unit may include expendable (e.g., single use) components (e.g., tether wires, electrodes, propellant), and storage cavities (e.g., bores, chambers).

A tethered electrode is an assembly of a filament (e.g., cord, wire, conductor, group of cords and/or conductors) and an electrode at least mechanically coupled to an end portion of the filament. A portion of the filament near the other end of the filament is at least mechanically coupled to the deployment unit and/or the launch device (e.g., one end fixed within the deployment unit), generally until the deployment unit is removed from the electronic weapon. As discussed below, mechanical coupling may facilitate electrical coupling of the launch device and the electrode prior to and/or during operation of the electronic weapon.

A launch device of an electronic weapon launches at least one tethered electrode of the electronic weapon toward a target. As the electrode travels toward the target, the electrode deploys (e.g., pulls) a length of filament from storage within the deployment unit. The filament trails the electrode. After launch, the filament spans (e.g., extends, bridges, stretches) a distance from the deployment unit to the electrode that is generally positioned in or near a target.

Electronic weapons that use tethered electrodes, according to various aspects of the present invention, include hand-held devices, apparatus fixed to buildings or vehicles, and stand-alone stations. Hand-held devices may be used in law enforcement, for example, deployed by an officer to take custody of a target. Apparatus fixed to buildings or vehicles may be used at security checkpoints or borders, for example, to manually or automatically acquire, track, and/or deploy electrodes to stop intruders. Stand-alone stations may be set up for area denial, for example, as used by military operations. Conventional electronic weapons such as the model X26 electronic control device and Shockwave™ area denial unit, each marketed by TASER International, Inc., may be modified to implement the teachings of the present invention by replacing the conventional deployment units with deployment units having electrodes as discussed herein.

An electrode, according to various aspects of the present invention, provides a mass for launching toward a target. The intrinsic mass of an electrode includes a mass that is sufficient to fly, under force of a propellant, from a launch device to a target. The mass of the electrode includes a mass that is sufficient to deploy (e.g., pull, uncoil, unravel, draw) a filament from storage and/or pay out a filament from storage on or in the electrode. The mass of the electrode is sufficient to deploy a filament behind the electrode while the electrode flies toward a target. The mass of the electrode deploys the filament from storage and behind the electrode in such a manner that the filament spans a distance between the launch device and the electrode positioned at a target. The mass of an electrode is generally insufficient to cause serious blunt impact trauma to a target. In one implementation, the mass of an electrode that draws a filament from storage in a deployment unit is in the range of 2 to 3 grams, preferably about 2.8 grams.

An electrode provides a surface area for receiving a propelling force to propel the electrode away from a launch device and toward a target. Movement of the electrode away from the launch device is limited by aerodynamic drag and by a resistance force (e.g., tension in the filament) that resists deploying a filament from storage and pulling the filament behind the electrode in flight toward a target.

A forward portion of an electrode may be oriented toward a target prior to launch. Upon launch and/or during flight from the launch device toward the target, the forward portion of the electrode may orient toward the target. An electrode may have an aerodynamic form for maintaining the forward portion of the electrode oriented toward a target. The aerodynamic form of an electrode provides suitable accuracy for hitting the target.

An electrode includes a shape for receiving a propelling force to propel the electrode toward a target. A shape of an electrode may correspond to a shape of a portion of the launch device or deployment unit that provides a propelling force to propel the electrode. For example, a cylindrical electrode may be propelled from a cylindrical tube of a deployment unit. During a launch of an electrode by expanding gas, the electrode may seal the tube to accomplish suitable acceleration and muzzle velocity. A rear face of the cylindrical electrode may receive substantially all of the propelling force.

An electrode may include a substantially cylindrical overall shape. Prior to launch, such an electrode is positioned in a substantially cylindrical tube slightly larger in diameter than the electrode. A propelling force (e.g., rapidly expanding gas) is applied to a closed end of the tube. The force pushes against a rear portion of the electrode to propel the electrode out of an open end of the tube toward a target.

An electrode includes a shape and a surface area for aerodynamic flight for suitable accuracy of delivery of the electrode across a distance toward a target, for example, about 15 to 35 feet from a launch device to a target. An electrode may rotate in-flight to provide spin stabilized flight. An electrode may maintain its pre-launch orientation toward a target during launch, flight to, and impact with a target.

An electrode or major portion of an electrode may have a conical or frustoconical shape (e.g., cone, golf tee, series of axially nested cones) with the base of the shape receiving the propelling force.

On impact, an electrode mechanically couples to a target. Mechanical coupling includes penetrating target clothing and/or tissue, resisting removal from clothing and/or tissue, remaining in contact with a target surface (e.g., tissue, hair, clothing, armor), and/or resisting removal from the target surface. Coupling may be accomplished by piercing, lodging (e.g., hooking, grasping, entangling, adhering, gluing), and/or wrapping (e.g., encircling, covering). An electrode, according to various aspects of the present invention, includes structure (e.g., hook, barb, spear, glue ampoule, tentacle, bolo) for mechanically coupling the electrode to a target. A structure for coupling may penetrate a protective barrier (e.g., clothing, hair, armor) on an outer surface of a target.

An electrode may include an integral structure or separate part functioning as a spear (e.g., pointed shaft, needle). The spear penetrates target clothing and/or tissue up to the length of the spear (e.g. up to a face of the electrode). Penetration is arrested by friction (e.g., contact of the spear with target clothing or tissue, abutment of a face of the electrode and the target). A spear may extend away from a face of the electrode toward the target. The spear may include one or more barbs for increasing the strength of the mechanical coupling of the electrode to the target. The barbs may be arranged to accomplish suitable mechanical coupling at various lengths of penetration of clothing and/or tissue.

An electrode is mechanically coupled to a filament to deploy the filament from storage and to extend the filament from the launch device to the target. Mechanical coupling includes coupling a filament and an electrode with sufficient strength to retain the coupling during manufacture, prior to launch, during launch, after launch, during mechanical coupling of the electrode to a target, and while delivering a stimulus signal to a target. Mechanical coupling may be accomplished by confining the filament between surfaces of an electrode and/or confining the filament within a portion of the electrode (e.g., establishing a suitable stiction between a portion of the filament and one or more surfaces of an electrode). Confining may include enclosing, holding, retaining, maintaining mechanical coupling, and/or resisting separation. Confining may be accomplished by preventing or resisting movement or deformation (e.g., stretching, twisting, bending) of the filament. As discussed below, placing the filament in an interior and affixing a spear over the interior in one implementation confines the filament to the interior.

An electrode facilitates electrical coupling of the launch device and the target. Electrical coupling generally includes a region or volume of target tissue associated with the electrode (e.g., a respective region for each electrode when more than one electrode is used). According to various aspects of the present invention, one or more structures of the electrode accomplish lower current density in the region or volume compared to prior art electrodes.

For each electrode, electrical coupling may include placing the electrode in contact with target tissue (e.g. touching, inserting) and/or ionizing air in one or more gaps between the launch device, the deployment unit, the filament, the electrode, and target tissue. For example, a placement of an electrode with respect to a target that results in a gap of air between the electrode and the target does not electrically couple the electrode to the target until ionization of the air in the gap. Ionization may be accomplished by a stimulus signal that includes, at least initially, a relatively high voltage (e.g., about 25,000 volts for one or more gaps having a total length of about one inch). After initial ionization, the electrode remains electrically coupled to the target while the stimulus signal supplies sufficient current and/or voltage to maintain ionization. Ionization may not be needed, for instance when contact is accomplished by spreading involving direct conduction from a filament to the target.

Assembly of a tethered electrode, according to various aspects of the present invention, is reliably accomplished in less time and with fewer and/or different operations than employed by prior art techniques. Manufacturing cost savings may result.

An electrode for use with a deployment unit and/or an electronic weapon, according to various aspects of the present invention, performs the functions discussed above. For example, any of electrodes 142, 143, 600, 800, and 1000 of FIGS. 1-14 may be launched from weapon 100 toward a target to establish a circuit with the target to provide a stimulus signal through the target.

Electronic weapon 100 of FIG. 1 includes launch device 110 and deployment unit 130. Launch device 110 includes user controls 112, processing circuit 114, power supply 116, and signal generator 118. In one implementation, launch device 110 is packaged in a housing. The housing may include a mechanical and electrical interface for a deployment unit 130. Conventional electronic circuits, processing circuit programming, propulsion technologies, and mechanical technologies may be used, suitably modified, and/or supplemented as discussed herein.

A user control is operated by a user to initiate an operation of the weapon. User controls 112 may include a trigger, a manual safety, and/or a touch screen user interface operated by a user. When user controls 112 are packaged separately from launch device 110, any conventional wired or wireless communication technology may be used to link user controls 112 with processing circuit 114.

A processing circuit controls many if not all of the functions of an electronic weapon. A processing circuit may initiate a launch of one or more electrodes responsive to a user control. A processing circuit may control an operation of a signal generator to provide a stimulus signal. For example, processing circuit 114 receives a signal from user controls 112 indicating user operation of the weapon to launch an electrode and provide a stimulus signal. Processing circuit 114 provides a launch signal 152 to deployment unit 130 to initiate launch of one or more electrodes. Processing circuit 114 may provide a signal to signal generator 118 to provide the stimulus signal to the launched electrodes. Processing circuit 114 may include a conventional microprocessor and memory that executes instructions (e.g., processor programming) stored in memory.

A power supply provides energy to operate an electronic weapon and to provide a stimulus signal. For example, power supply 116 provides energy (e.g., current, pulses of current) to signal generator 118 to provide a stimulus signal. Power supply 116 may further provide power to operate processing circuit 114 and user controls 112. For hand held electronic weapons, a power supply generally includes a battery.

A signal generator provides a stimulus signal for delivery through a target. A signal generator may reform energy provided by a power supply to provide a stimulus signal having suitable characteristics (e.g., ionizing voltage, charge delivery voltage, charge per pulse of current, current pulse repetition rate) to interfere with target locomotion. A signal generator electrically couples to a filament to provide the stimulus signal through the target as discussed above. For example, signal generator 118 provides a stimulus signal to tethered electrodes 142-143 of deployment unit 130 via their respective filaments 140-141. Signal generator 118 is electrically coupled via stimulus interface 150 to filaments stored in deployment unit 130. The stimulus signal may consist of from 5 to 40 pulses per second, each pulse capable of ionizing air, each pulse delivering after ionization (if needed) about 80 microcoulombs of charge through a human or animal target having an impedance of about 400 ohms.

A deployment unit (e.g., cartridge, magazine) receives a launch signal from a launch device to initiate a launch of one or more electrodes and a stimulus signal to deliver through a target. A spent deployment unit may be replaced with an unused deployment unit after some or all electrodes of the spent deployment unit have been launched. An unused deployment unit may be coupled to the launch device to enable additional electrodes to be launched. A deployment unit may receive, via an interface, signals from a launch device to perform the functions of a deployment unit.

For example, deployment unit 130 may include one or more cartridges 132-134. Each cartridge 132 (134) may include one or more filaments 140 (141), one or more electrodes 142 (143), and one or more propellants 144 (145). A deployment unit stores a filament for each electrode or group of electrodes. Each filament mechanically couples to an electrode or group of electrodes as discussed herein. Via launch signal 152, processing circuit 114 initiates activation of propellant 144 (145) for one or more selected cartridges. Propellant 144 (145) propels one or more electrodes 142 (143) toward a target. Each electrode is coupled to deploy a respective filament from storage. As each electrode flies toward the target, each electrode deploys its respective filament out from its storage. Signal generator 118 provides the stimulus signal through the target via stimulus interface 150 and the filaments coupled to launched electrodes 142 (143).

Each propellant may serve to launch any number of electrodes. For instance, a deployment unit formed as a replaceable cartridge may include a housing, an electrical interface, two electrodes, one propellant for launching the two electrodes, and two filaments, one for each electrode.

An electrode, according to various aspects of the present invention, may perform one or more of the following functions in any combination: binding the filament to the electrode, deploying the filament, mechanically coupling the electrode to a target, enabling conduction of the stimulus current from the filament through the target, spreading a current density with respect to a region of target tissue, and diffusing a current into a volume of target tissue. Enabling conduction includes ionizing, spreading, and/or diffusing. Enabling conduction, may include ionization along or through insulative and/or composite material of one or more portions of the electrode. Enabling conduction may include ionization along or through insulative and/or composite material external to the electrode. Insulative materials include any material or substance (e.g., gas, liquid, solid, aggregation, suspension, composite, alloy, mixture) that presents, at any time or times, a relatively high resistance to current of the stimulus signal. Composite materials include insulative materials combined with conductive particles, layers, or fibers.

In operation with a target, an electrode conducts current in a circuit that includes the target and a signal generator. For example, circuit 200 of FIG. 2 includes filament 140, electrode 142, target tissue 202, and return path 204. Return path 204 in one implementation includes a conductor common to the signal generator and the target (e.g., earth). The return path in another implementation, not shown, includes a second tethered electrode (e.g., 134). Current of any conventional polarity or polarities may flow in one or more directions on any of the lines shown in FIG. 2 at various times.

An electrode has mass, shape, and surfaces for being attached to a filament, for being propelled, and for deploying the filament to a target, as discussed above. Conventional mass, shape, and surfaces may be employed. For example, an electrode may have a substantially cylindrical shape, an interior with surfaces that abut and/or grip a filament, and external surfaces with suitable aerodynamic properties for efficient propulsion and accurate flight to a target. An electrode may employ conductive, resistive, composite and/or insulative material on an intended path of conduction or propagation of stimulus current. An electrode may employ resistive, insulative, and/or composite material to diminish stimulus current conduction on undesired paths. An electrode may be rigid. To avoid breaking on impact, an electrode may have portions designed to flex to absorb energy of impact and thereby reduce the risk of breakage. Conventional metal and/or plastic fabrication technologies may be used in the manufacture of an electrode as discussed herein. Plastics may be filled with other materials (e.g., conductive particles, fibers, layers) to form composite materials uniformly or in suitable portions of a part.

An electrode may have any size and shape known in the art for suitably binding a filament and deploying a filament (e.g., substantially spherical, substantially cylindrical, having an axis of symmetry in the direction of flight, bullet shaped, tear drop shaped, substantially conical, golf tee shaped). In various implementations, an electrode may be formed of conductive, resistive, insulative, and/or composite materials, as discussed above. If insulative, a body portion of an electrode (i.e., all structures except those functioning as a spear, target retainer, or tip) may comprise composite material and/or be coated with insulative material.

A spear may perform mechanical coupling and/or be activated as discussed above. A spear may have any size and shape known in the art for suitably piercing material and/or tissue of a target, lodging in material and/or tissue of a target, and forming an ionized path from the tip of the spear to target tissue. In various implementations, a spear may be formed of conductive, resistive, insulative, and/or composite materials. A spear may be partially or entirely formed of a material that electrically insulates. When insulative, the electrode may comprise composite material and/or be coated with insulative material. Activation and use of a shaft and/or tip may reform paths along and/or through the insulative or composite material.

An insulator may be of a type (e.g., thickness, material, structure) that electrically insulates the spear against a current having a voltage below a threshold, but fails to insulate the spear against a current having a voltage above the threshold. An insulator may be formed (e.g., shaped, applied, positioned, removed, partially removed, cut) to establish a likely location on the spear where the insulator may fail to insulate against a current having a voltage above a threshold. An insulator may define a series of gaps between conductors of the spear or conductive portions of the spear. The gaps may act as switches operative to conduct in response to the applied voltage of the stimulus signal.

A tip (e.g., point, cone, apex comprising acute angles between faces, end of a shaft of relatively small diameter) operates to pierce an outer surface (e.g., layer) of a target and/or target tissue. A tip of a spear facilitates mechanical coupling by piercing and lodging. A tip when insulated may operate as a gap or switch interfering with current flow (e.g., blocking) until a threshold voltage breaks down the insulator and/or permits ionization near the tip followed by current flow through the tip.

A barb operates to lodge (e.g., retain) an electrode in clothing, armor, and/or tissue of a target to retain a mechanical coupling between the barb and the target. A barb portion of a spear resists mechanical decoupling (e.g. separation or removal from the target). A spear may include a barb near the tip. A spear may include a plurality of barbs arranged at increasing distance from the tip. A barb may include a continuous surface of the spear (e.g., a helical channel or ridge, a screw thread or channel, a surface having an undulation that increases friction between the barb and the target.

According to various aspects of the present invention, an electrode may comprise several structures that are coupled together to complete assembly of the electrode. These structures, when independent objects, are herein called parts, as opposed to portions of the same object. Receiving and conducting the stimulus signal is herein called activation.

Figure 3A:
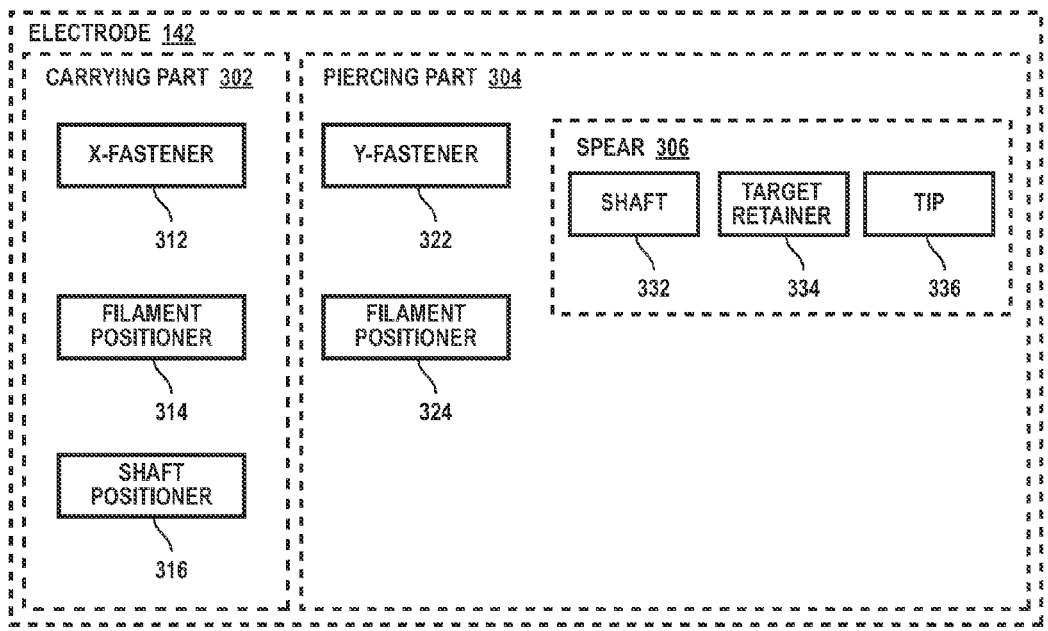
FIG. 3A is a functional block diagram of an electrode of the electronic weapon of FIG. 1.

A functional block diagram of an electrode, according to various aspects of the present invention, illustrates functional and structural cooperation. A carrying part and a piercing part may be mechanically coupled together. A carrying part carries a filament and/or retains a filament. A piercing part pierces clothing and/or tissue of a target to mechanically couple an electrode to a target. As shown in FIG. 3A, electrode 142 performs mechanical and electrical functions discussed above. Electrode 142 of FIG. 3A may be activated via filament 140 (not shown) with current to and/or from signal generator 118. Electrode 142 may be activated with current to and/or from target tissue 202 (not shown). Currents may pass via one or more paths through electrode 142 and via one or more paths through target tissue 202.

Electrode 142 of FIG. 3A includes carrying part 302 and piercing part 304. Carrying part 302 includes x-fastener 312, filament retainer 314, and shaft positioner 316. Piercing part 304 includes y-fastener 322, filament positioner 324, and spear 306. Spear 306 includes shaft 332, target retainer 334, and tip 336. The total mass of electrode 142 may be distributed between carrying part 302 and piercing part 304 to accomplish desired deployment behavior and target retaining behavior. Conventional ballistics analysis techniques may be used.

A carrying part mechanically couples to a piercing part. For example, carrying part 302 includes x-fastener 312. Piercing part 304 includes y-fastener 322. The x-fastener 312 and y-fastener 322 represent mating fasteners of conventional technologies. Any fastening technology may be used (e.g., threading, snapping, hook and loop, friction fit, bayonet, latching). According to various aspects of the present invention, x- and y-fasteners may comprise surfaces suitable for any joining technology (e.g., gluing, welding, sonic welding).

Carrying part 302 includes filament retainer 314. Filament retainer 314 mechanically retains the filament to enable electrode 142 to deploy the filament when electrode 142 is deployed. Retention may include any fastening technology (e.g., screw threads, bayonet type, snap, latch), binding technology (e.g., friction fitting, staking), and/or joining technology (e.g., sonic welding, adhesives), for example, as discussed above, that is suitable for reliably securing a filament to the carrying part. Binding by friction facilitates relatively low manufacturing cost, mechanical reliability, and ease of manual and/or automated assembly of electrode 142. One end of a filament may be retained (e.g., fixed in place) to carrying part 302 by filament retainer 314 before assembling fastening part 302 with piercing part 304.

X-fastener 312 and y-fastener 322, according to various aspects of the present invention, may cooperate with the filament retainer 314 to accomplish retention. For example, compression required to assemble x- and y-fasteners to each other and/or resulting from fastening may exert a force that increases friction for suitable binding.

A carrying part may partially enclose a piercing part. In another implementation, a piercing part may partially enclose a carrying part. According to various aspects of the present invention, particular synergies are realized in an electrode 142 that is assembled by combining carrying part 302 and piercing part 304 on an axis. For example, when x-fastener 312 has a first axis and y-fastener 322 has a second axis, these fasteners may be aligned to an alignment axis and then moved together along the alignment axis to accomplish assembly of the two parts.

Carrying part 302 may further include one or more structural features that position a shaft of a spear. Shaft positioner 316 securely maintains a position of spear 306 with respect to a front face of electrode 142. Shaft positioner 316 may retain shaft 332 at a particular length extending away from the front face. Shaft positioner 316 may be capable of retaining shaft 332 at one of a set of fixed lengths selected during assembly of electrode 142. By permitting selection during assembly, different electrode designs may be manufactured from parts that are common to all designs (e.g., same carrying part, same spear).

A front face of an electrode resists further penetration of electrode 142 into a target. A front face having dimensions larger than the diameter of shaft 332 stops penetration of shaft 332 by abutting target clothing or tissue 202. Consequently, a shaft positioner when implemented with a front face may determine a maximum depth of penetration of an electrode into a target.

Carrying part 302 may be implemented as an integral monolithic structure formed of one material. Forming may include molding, casting, extruding, and/or milling. When carrying part 302 is desired to be non-insulative (conductive, resistive, or subject to ionization along or through after an activation voltage is exceeded), conductive filler may be included in the material used to form carrying part 302.

Figure 2:
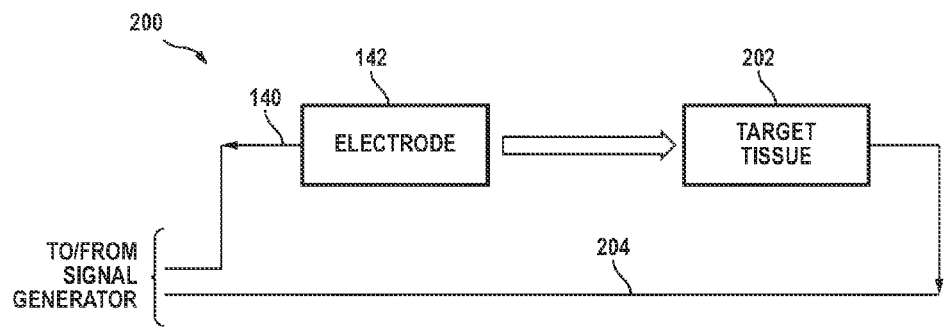
FIG. 2 is a functional block diagram of a circuit that includes a target and an electrode of the electronic weapon of FIG. 1.

A piercing part pierces clothing or target tissue to form and to mechanically maintain the electrical circuit discussed with reference to FIG. 2. A piercing part may retain a filament as discussed above and may electrically couple a filament to the target by positioning the filament proximate to the target. A piercing part may be implemented as an integral monolithic structure formed of one material. A piercing part may include a spear as a separate part that is combined to form the complete piercing part.

For example, piercing part 304 performs the functions of an electrode discussed above in cooperation with carrying part 302. Y-fastener 322 establishes and secures the assembly of the carrying part 302 and piercing part 304 through the mechanical stresses of launching, filament deployment, and electrode impact with a target. Filament positioner 324 maintains the filament in relation to piercing part 304 and thereby maintains the filament in relation to target tissue. A spear performs the piercing function of a piercing part of an electrode. A spear may also perform a retaining function to mechanically retain the electrode in contact with the target (e.g., by maintaining a relative position of the piercing part with respect to the target).

For example, spear 306 includes shaft 332, target retainer 334, and tip 336. A shaft supports a target retainer and a tip. A shaft and tip cooperate to accomplish piercing to a desired depth. The shaft is generally suitable for penetration of clothing and/or target tissue. The length of the shaft may locate the tip a desired distance from a front face of the electrode, as discussed above, so that only the shaft and tip penetrate target clothing and/or tissue when the face abuts the target. The shaft may flex a suitable amount on impact to avoid breakage.

A target retainer resists removal of the shaft from the target. A target retainer may be implemented with one or more barbs arranged behind the tip.

A tip includes any structure that pierces target clothing and/or tissue. A tip may include one or more points front-facing toward the target. A tip may be formed with a target retainer immediately behind the tip (e.g., barb, rear-facing point).

Figure 3B:
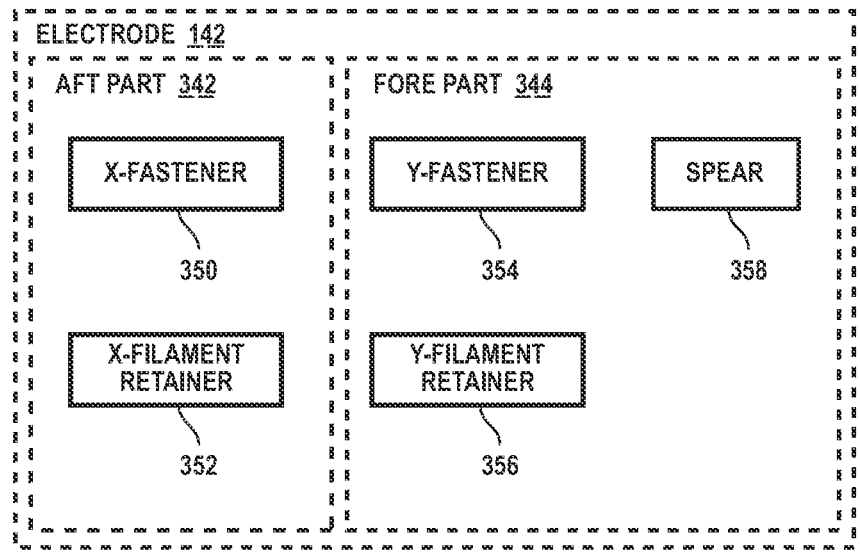
FIG. 3B is a functional block diagram of another electrode for the electronic weapon of FIG. 1.

The total mass of electrode 142 of FIG. 3B may be distributed between aft part 342 and fore part 344 to accomplish desired deployment behavior and target retaining behavior. Conventional ballistics analysis techniques may be used.

Another functional block diagram of an electrode, according to various aspects of the present invention, illustrates somewhat different functional and structural cooperation. Electrode 142 of FIG. 3B includes aft part 342 and fore part 344. Aft part 342 includes x-fastener 350 and x-filament retainer 352. Fore part 344 includes y-fastener 354, y-filament retainer 356, and spear 358. In implementations according to this functional block diagram, electrode 142 performs the functions discussed above. Electrode 142 is assembled by mating x-fastener 350 with y-fastener 354 where x-fastener 350 and y-fastener 354 may include the structures and functions discussed above with reference to x-fastener 312 and y-fastener 322.

The function of retaining a filament, as discussed above, is performed by x- and y-filament retainers 352 and 354 when assembly of electrode 142 is completed. In one implementation, x- and y-filament retainers bind a filament when abutted against each other. Any conventional two-part retention technology may be used (e.g., fastening, binding, joining) between an end of a filament, x-filament retainer, and y-filament retainer.

X-fastener 350 and y-fastener 354 may cooperate with x-filament retainer 352 and y-filament retainer 354 to distribute strain occurring between electrode 142 and a filament. Distributing strain may facilitate using smaller, lighter, and/or weaker technologies for these functions individually.

Spear 358 may include the structures and perform the functions discussed above with reference to spear 306. In the absence of the need to cooperate with a shaft positioner, spear 358 may be structurally simpler than spear 306. Spear 358 may be integral to fore part 344 (e.g., formed of the same material and/or formed at the same time). Spear 358 may be fixed to fore part 344 prior to assembly of aft and fore parts 342 and 344.

According to various aspects of the present invention, electrode 142 of FIG. 3B may be assembled by combining aft part 342 and fore part 344 on an axis. For example, when x-fastener 350 has a first axis and y-fastener 354 has a second axis, these fasteners may be aligned to an alignment axis and then moved together along the alignment axis to accomplish assembly of the two parts.

Another functional block diagram of an electrode, according to various aspects of the present invention, illustrates somewhat different functional and structural cooperation. Electrode 142 of FIG. 3C includes aft part 362 and fore part 364. Aft part 362 includes x-filament retainer 370 that also serves to retain aft part 362 and fore part 364 in an assembled configuration. Fore part 364 includes y-filament retainer 372, mass 374, target retainer 376, and tip 378.

Figure 3C:
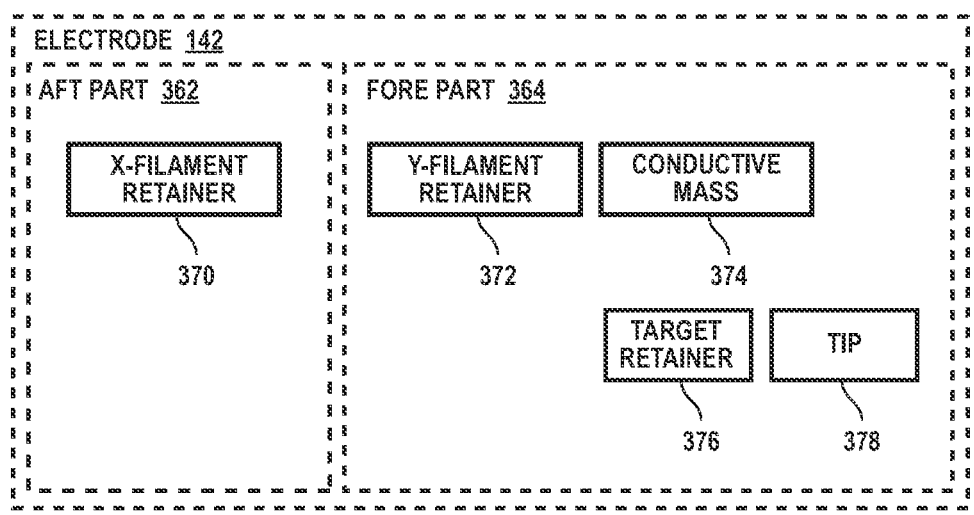
FIG. 3C is a functional block diagram of still another electrode for the electronic weapon of FIG. 1.

In implementations according to the functional block diagram of FIG. 3C, electrode 142 performs the functions discussed above. Electrode 142 is assembled by mating x-filament retainer 370 with y-filament retainer 372. X-filament retainer 370 and y-filament retainer 372 may include the structures and functions discussed above with reference to x-fastener 350, y-fastener 354, x-filament retainer 352, and y-filament retainer 356, suitably designed to accomplish fastening and filament retaining without distribution of strain as discussed above with reference to FIG. 3B.

Fore part 364 may include substantially all of the mass of electrode 142 (e.g., greater than 80%, about 90%) Such a mass distribution may inhibit tumbling of electrode 142 during launching, deployment, and/or impacting a target. For example, mass 374 may comprise a material of greater density than materials of other portions of fore part 364. In one class of implementations, mass 374 comprises a plastic carrier impregnated with particles and/or fibers of denser material (e.g., metal, carbon, graphite, brass, stainless steel). Mass 374 may be formed on or about a shaft portion of fore part 364. A front face, as discussed above, for fore part 364 may be provided by mass 374.

Fore part 364 performs the functions discussed above with reference to a spear by integrating the target retainer and tip in the structure of fore part 364. Fore part 364 may include an integral shaft to position tip 378 a suitable distance in front of a face of fore part 364. Fore part 364 may omit the shaft structure of the spear as discussed above.

According to various aspects of the present invention, an electrode 142 of FIG. 3C may be assembled by combining aft part 362 and fore part 364 on an axis. For example, when x-filament retainer 370 has a first axis and y-filament retainer 372 has a second axis, these retainers may be aligned to an alignment axis and then moved together along the alignment axis to accomplish assembly of the two parts.

Electrode 142 of FIGS. 3A, 3B, and 3C may be implemented to provide spreading. For example, an end of filament 140 may be positioned at or near a front face of electrode 142. Either or both parts of each electrode design may support propagation of electricity from the filament to the target. For example, either or both parts may comprise non-insulative materials (e.g., conductive, resistive, insulative, composite).

Electrode 142 of FIGS. 3A, 3B, and 3C may be implemented to provide diffusing. For example, material forming a front face, spear, target retainer, and/or tip may comprise non-insulative materials.

Figure 4:
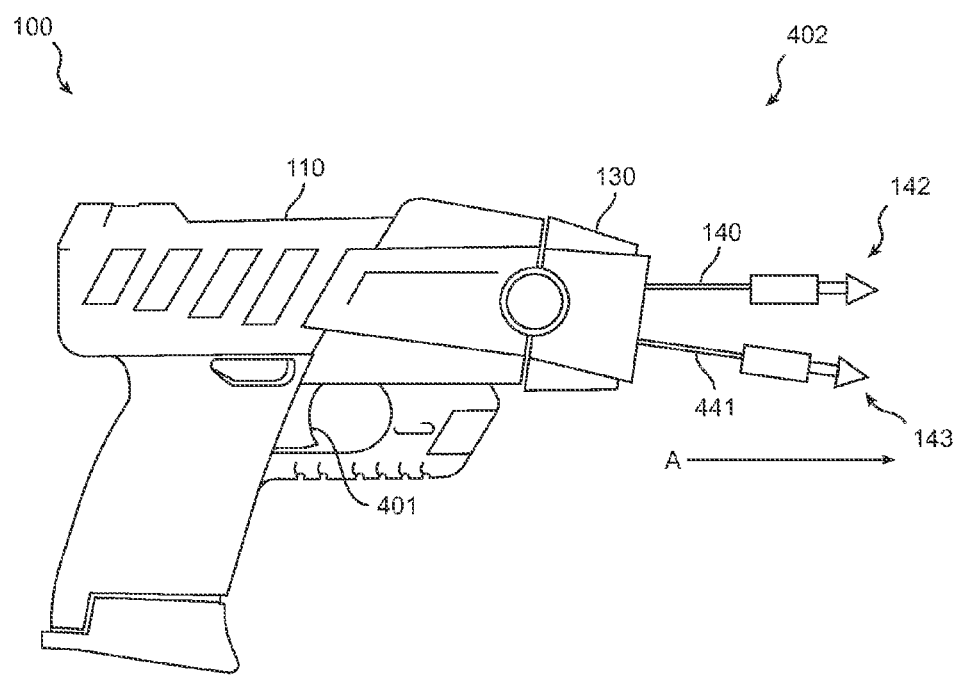
FIG. 4 is a side plan view of an implementation of the electronic weapon of FIG. 1 a moment after the launch of two electrodes according to any of FIGS. 3A, 3B, and 3C.

An electronic weapon 100, according to various aspects of the present invention, may launch two electrodes each of any type discussed herein with reference to electrode 142, where one electrode serves in the return path, as discussed above. For example, electronic weapon 100 of FIG. 4 is shown immediately after a user initiated launch of two electrodes from a deployment unit. Electronic weapon 100 includes a hand-held launch device 110 that receives and operates one field-replaceable cartridge 130 as a type of deployment unit. Launch device 110 houses a power supply (having a replaceable battery), a processing circuit, and a signal generator as discussed above. Launch device 110 may be of the type known as a model M26 electronic control device marketed by TASER International, Inc. Cartridge 130 includes a plurality 402 of tethered electrodes including electrodes 142 and 143. Upon operation of trigger 401, electrodes 142 and 143 are propelled from cartridge 130 generally in direction of flight "A" toward a target (not shown). As electrodes 142 and 143 fly toward the target, electrodes 142 and 143 deploy behind them filaments 140 and 441 respectively. When electrodes 142 and 143 are positioned in or near the target, filaments 140 and 441 extend from cartridge 130 to electrodes 142 and 143 respectively. The signal generator provides a stimulus signal through the circuit formed by filament 140, electrode 142, target tissue, electrode 143, and filament 441. Electrodes 142 and 143 mechanically and electrically couple to tissue of the target as discussed above.

Figure 5:
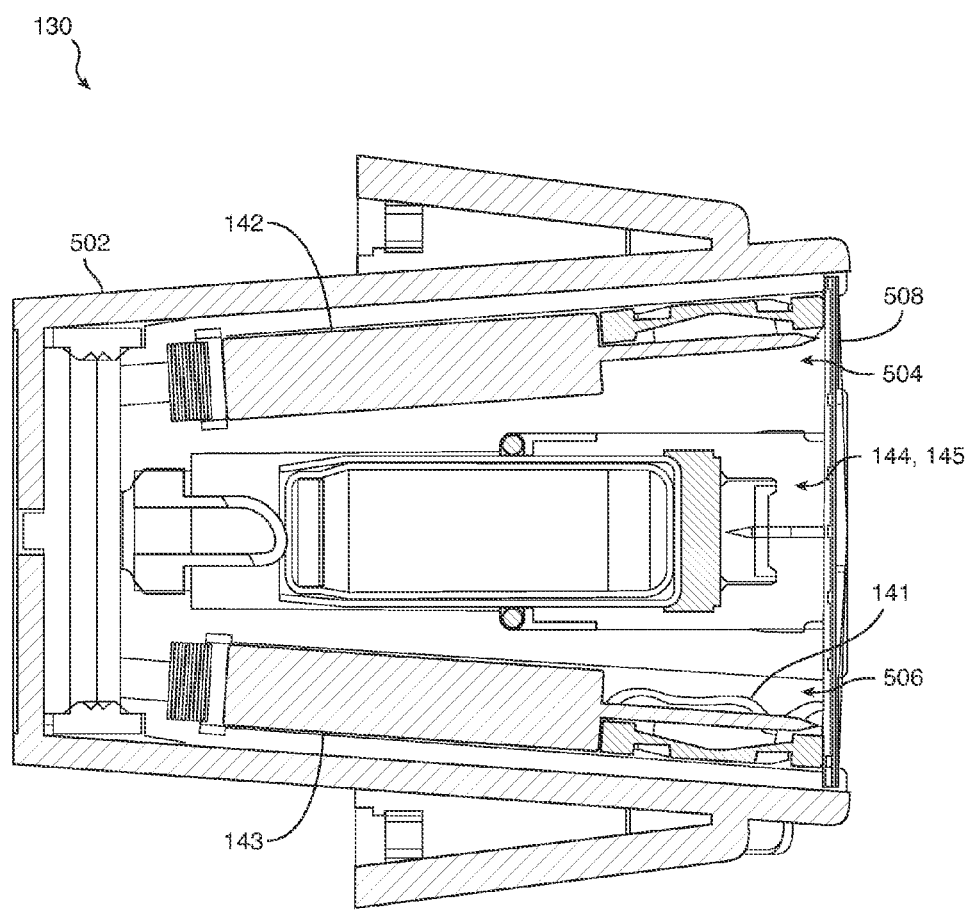
FIG. 5 is a cross-section view of the deployment unit of the electronic weapon of FIG. 4.

A deployment unit may substantially simultaneously deploy a plurality of electrodes. For example, deployment unit 130 of FIG. 5 includes the exterior dimensions, features, and operational functions, of a conventional cartridge of the type used with model M26 and X26 electronic control devices marketed by TASER International, Inc. FIG. 5 is drawn to scale with the angle formed by the launch tubes being 8 degrees. For deployment unit 130, two electrodes are simultaneously propelled from respective cylindrical launch tubes (e.g., bore, chamber) in a housing of the deployment unit. For example, deployment unit 130 includes housing 502, cover 508, filament storage (not shown), bores 504 and 506, propellant system 144, 145 comprising several components, and tethered electrodes 142 and 143. Each tethered electrode 142 (143) is mechanically coupled to a respective filament (one shown) 141, to deploy the filament with the electrode. Spaces for filament storage are located on both sides of the plane of the bores of the housing, so that in the cross-section view of FIG. 5, one storage space is removed by cross section and the other is hidden. In use, the propellant explosively provides a volume of gas that pushes each electrode 142 (143) from the respective bore 504 (506). Acceleration, muzzle velocity, flight dynamics, and accuracy of hitting the target are affected by the fit of the electrode as it leaves the bore. Any diameter along the length of the electrode that exceeds a limit interferes for a period of time unnecessarily with propelling the electrode from the bore.

Portions and/or parts of an electrode, as discussed above, may be formed, according to various aspects of the present invention, of materials that are not highly conductive. These materials are discussed above as resistive, insulative, and composite. The structure of these materials may be uniform through a volume or nonuniform. When uniform, electrical activation may be in accordance with a resistance per unit length and one or more lengths of conduction (path lengths) needed to accomplish suitable activation. Nonuniformity may be accomplished by varying the blend of constituents of the material when molding the desired structure, or by arranging materials of different properties in series assembly. Nonuniformity may cause resistance to increase away from the target or to any desired nonlinear extent. Conductive and/or resistive materials may be combined with insulative materials in any conventional fashion.

Insulative materials include nonconductors. When exposed to ionization voltages, portions of insulative materials along paths of ionization may reform (e.g., wear, deform, mobilize, melt, vaporize, temper, congeal, crystallize, stratify, reconstitute) into resistive materials, voids, and/or pockets of component materials (e.g., liquids or gases). Reformed insulative materials are examples of resistive or non-insulative materials. Reformation may change a magnitude of voltage needed for a desired activation. Insulative materials may comprise plastic, nylon, fiberglass, or ceramic. Insulative coatings include lacquer, black zinc, a dielectric film, a non-conductive passivation layer, a polyp-xylylene polymer (e.g., Parylene), polytetrafluoroethylene (e.g., Teflon), a thermoplastic polyamide (e.g., Zytel). Conventional insulative technologies may be used.

Insulative materials of a type herein called composite materials may include separated conductors. Conventional composite materials are manufactured and used for molding and overmolding. For example, a composite material may be formed from a liquid resin, plastic, or thermoplastic as a host material with solid fibers, spheres, ellipsoids, powder, or other particles as filler mixed into the host before the host cures to a solid. Host material may be plastic, nylon, PEEK (polyetheretherkeytone), thermoplastic elastomer (e.g., thermoplastic polyurethane (TPU)), SBS poly(styrene-butadiene-styrene) rubber. Particles of conductive (e.g., metal, stainless steel, tungsten) or resistive (e.g., carbon) material may be used as filler. Particles having a coating of conductive or resistive material may be used as filler. For example, insulative material of the type marketed by RTP Co. as thermoplastic polyurethane elastomer (TPUR/TPU) comprising nickel-coated carbon fiber may be used. Spheres or powder may have a diameter of from about 3 to about 11 microns. Fibers may have a similar diameter and a length of from about 5 to about 7 millimeters. Filler to host by weight may be from about 5% to about 40% to assure separation (nonoverlap) of particles. Composition may result in activation voltages of from about 50 volts to about 6000 volts for components of electrodes 142. In operation at voltages expected to be sufficient for ionization between nonoverlapping particles, composite materials are also examples of non-insulative material.

Figure 6:
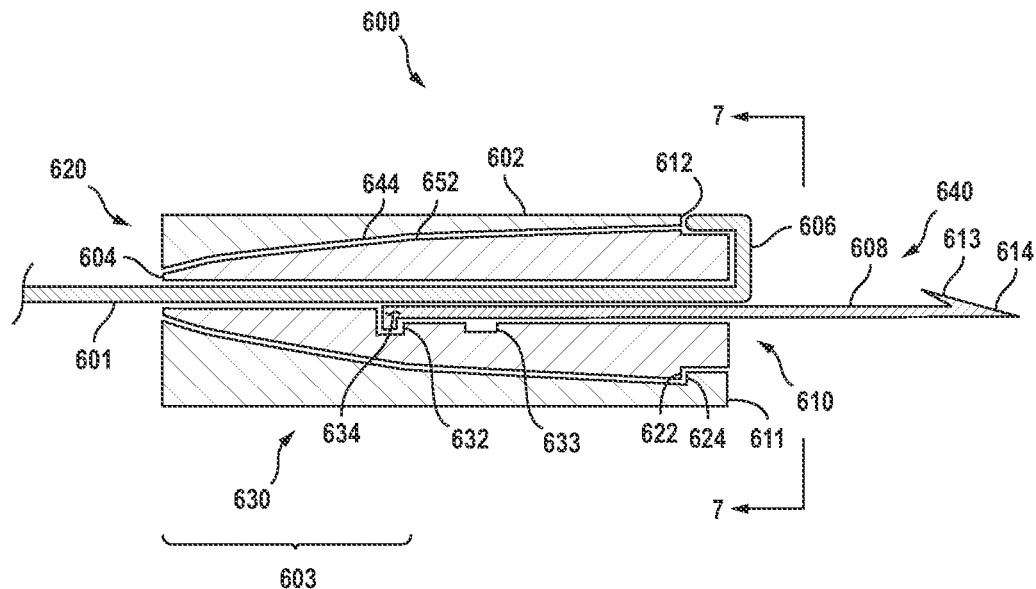
FIG. 6 is a cross-section view of an electrode in an implementation according to FIG. 3A.
Figure 7:
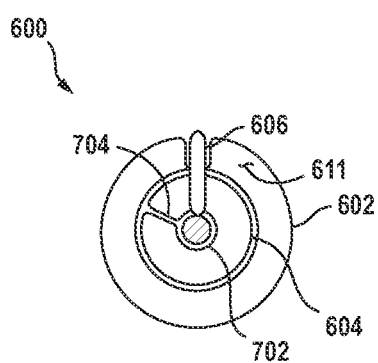
FIG. 7 is a view of the rear face of the electrode of FIG. 6.

A tethered electrode 600, of FIGS. 6 and 7, in accordance with the functions discussed above with reference to FIGS. 1, 2, 3A, 4, and 5, retains a filament 601 in an assembly of a carrying part 602 and piercing part 604. Electrode 600 is substantially cylindrical as shown in the rear view of surface 620 in FIG. 7. Carrying part 602 includes an x-fastener (surface 622) and a filament positioner (notch 612). Retention of filament 601 is accomplished by the cooperation of carrying part 602 and piercing part 604. Piercing part includes a y-fastener (surface 624), a filament retainer (bore 702), a shaft positioner (two notches 630), and a spear 640 having an elbow 634, a shaft 608, a target retainer (barb 613), and a tip 614. A filament positioner is omitted from piercing part 604.

Carrying part 602 includes a cylindrical outer surface 642 and a conical inner surface 644 so as to accept piercing part 604. Piercing part 604 has a substantially conical outer surface 652 and a substantially central bore 702.

When unassembled, slot 704 opens to accept spear 610 and filament 601. Spear 610 may be positioned for one of two lengths measured from front face 611 of electrode 600 to tip 614. For a first length, as shown, elbow 634 of shaft 608 is located over notch 632 so that a portion of shaft 608 extends into notch 632. For a second longer length, elbow 634 is located over notch 633 and is retained in piercing part 604 in a way analogous to the configuration of the first length. Filament 601 is then placed in bore 702 in abutting contact along a rear portion of shaft 608. Filament 601 is extended past front face 611 and toward notch 612. A portion of filament 601 may be uninsulated to facilitate electrical coupling of filament 601 and target tissue with little or no need for ionization. The uninsulated portion may include elbow 606 and further may include additional portions of filament 601 proximate to elbow 606.

To assemble electrode 600, carrying part 602 is threaded onto filament 601 and set aside. An axial opening for access to bore 702 in piercing part 604 is opened and shaft 608 is located in a suitable notch 630. Filament 601 is laid on top of shaft 608. Piercing part 604 is then compressed circumferentially with respect to an axis of circular symmetry to close the axial opening. Carrying part 602 is aligned on the same axis as piercing part 604 and the two parts are pressed together until surface 622 of piercing part 602 snaps over and latches against surface 624 of carrying part 604. When assembled, a resistance to expand radially of carrying part 602 causes surfaces 644 and 652 to grip in friction fit against each other, to retain filament 601 in bore 702, and to retain elbow 634 over the selected notch of notches 630. The assembly is held together by the mechanical interference of surfaces 622 and 624 that form a fastener (e.g., latch, catch, snap).

Notch 612 may be dimensioned to retain filament 601 by friction fit.

Bore 702 may be dimensioned to retain filament 601 by friction fit in the absence of carrying part 602 and/or when assembled with carrying part 602 (e.g., bore 702 diameter reduced by radial pressure).

Figure 8:
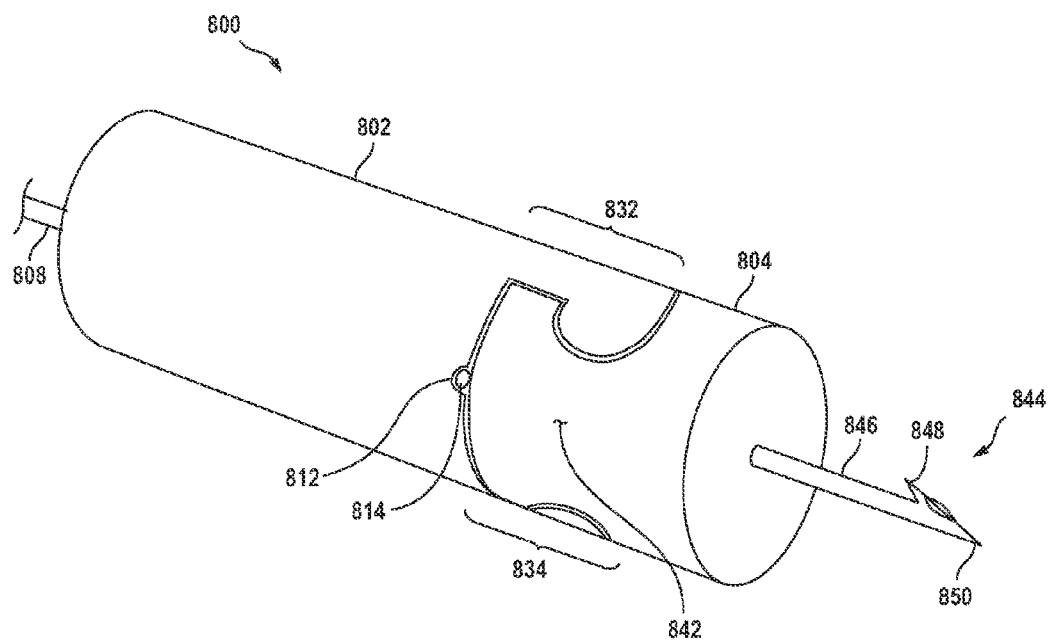
FIG. 8 is a perspective view of an electrode in another implementation according to FIG. 3B.
Figure 9:
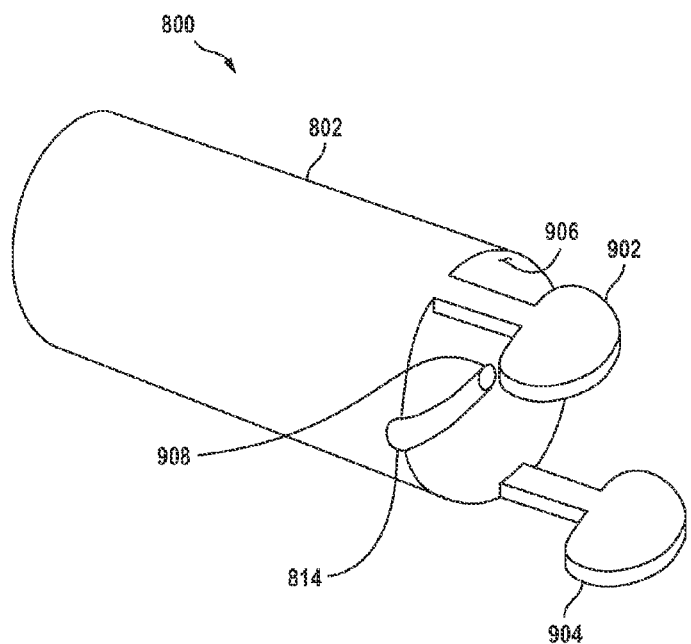
FIG. 9 is a perspective view of the rear portion of the electrode of FIG. 8.
Figure 10:
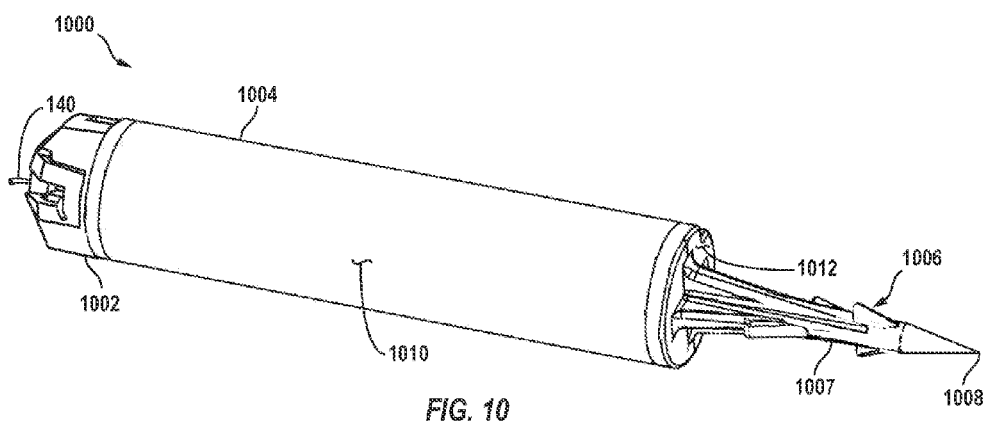
FIG. 10 is a perspective view of an electrode in still another implementation according to FIG. 3C.

Another tethered electrode 800, of FIGS. 8 and 9, in accordance with the functions discussed above with reference to FIGS. 1, 2, 3B, 4, and 5, retains a filament 808 in a coaxial assembly of aft part 802 and fore part 804. Electrode 800 is substantially cylindrical as shown in the perspective views of FIGS. 8 and 9. Aft part 802 includes an x-fastener (tabs 832 and 834) and an x-filament retainer (notch 812). Fore part 804 includes a y-fastener (tab 842 and a symmetrically arranged identical tab not shown but diametrically opposite tab 842), a y-filament retainer (rear surface of fore part 804), and a spear 844 comprising a shaft 846, a target retainer 848, and a tip 850. Fore part 804 may be formed of plastic or metal (e.g., brass, aluminum). Spear 844 may be formed of the same material (e.g., cast, machined) or a dissimilar material (e.g., stainless steel inserted into plastic rear portion).

In one implementation, shaft 846, target retainer 848, and tip 850 are formed of relatively more resistive or insulative (e.g. composite material) than the other portions of fore part 804 (e.g., activation at relatively higher voltage).

When unassembled, bore 908 or FIG. 9 accepts filament 808. Filament 808 is bent and pressed into channel 814 in face 906 of aft part 802. Channel 814 retains filament 808 by friction fit. Friction is increased when fore part 804 abuts filament 808 when locked in assembled position against aft part 802.

To assemble electrode 800, filament 808 is threaded into aft part 802 and laid into channel 814. The, aft part 802 is aligned on a common cylindrical axis with fore part 804, and the two parts are pushed together until the fasteners (tabs 832, 834, 842) fasten to each other. Four tabs interdigitate: 902 and 904 with tabs 842 and its symmetrical opposite tab (not shown). The assembly is held together by the mechanical interference of the four tabs that form a fastener (e.g., latch, catch, snap). The force to operate the fastener conforms filament 808 to channel 814 and increases friction between filament 808 and abutting surfaces of the channel and fore part 804 to accomplish the filament retaining function.

Another tethered electrode 1000, of FIGS. 10-14, in accordance with the functions discussed above with reference to FIGS. 1, 2, 3C, 4, and 5, retains a filament 140 in an assembly of aft part 1002 and fore part 1004. Electrode 1000 is substantially cylindrical as shown in the perspective views of FIG. 10. Aft part 1002 includes an x-filament retainer comprising a channel 1120 formed with two latch arms 1206 and 1406. Fore part 1004 includes a y-filament retainer comprising base 1310 having an irregular surface 1312 formed with anvil 1304 that cooperates with latch arms 1206 and 1406. Fore part 1004 additionally includes a mass 1102 with a surface 1010 for propagating stimulus current to the target, a front face 1012, a target retainer 1006 comprising a shaft 1007, barb 1108, and tip 1008. Aft part 1002 may be formed of resilient material (any relatively soft plastic). Fore part 1004 may be formed of rigid material (e.g., any relatively hard plastic, composite material).

Figure 11:
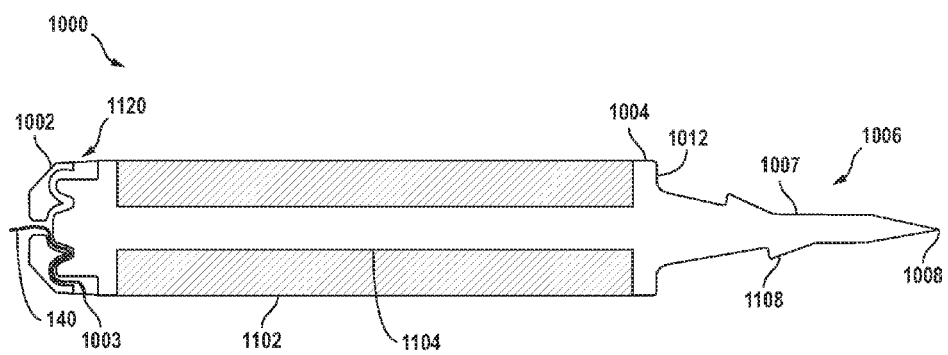
FIG. 11 is a cross-section view of the electrode of FIG. 10.

In the cross section view of FIG. 11 taken along an axis of circular symmetry of electrode 1000, surfaces of filament retainer 1002 and fore part 1004 are shown cooperating to retain filament 140 by friction in a channel 1120 that proceeds symmetrically in two directions from opening 1220. Filament 140 is forced to conform to surfaces defining channel 1120 as aft part 1002 is fastened to fore part 1004. Mass 1102 is overmolded onto shaft 1104 of fore part 1004. Mass 1102 is formed of resistive and/or composite material with an exposed surface 1010 suitable for propagating current from an exposed end 1003 of filament 140 toward front face 1012.

Figure 12:
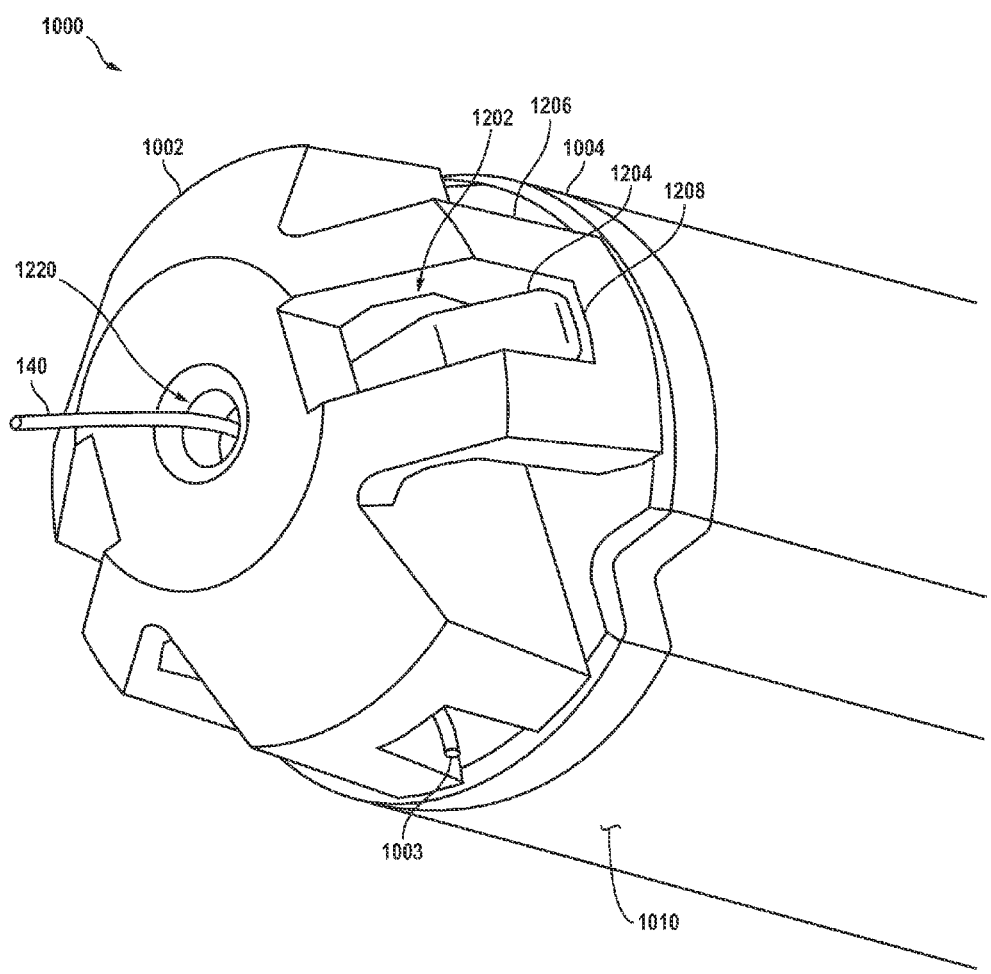
FIG. 12 is a perspective view of a portion of the electrode of FIG. 10, fully assembled.
Figure 13:
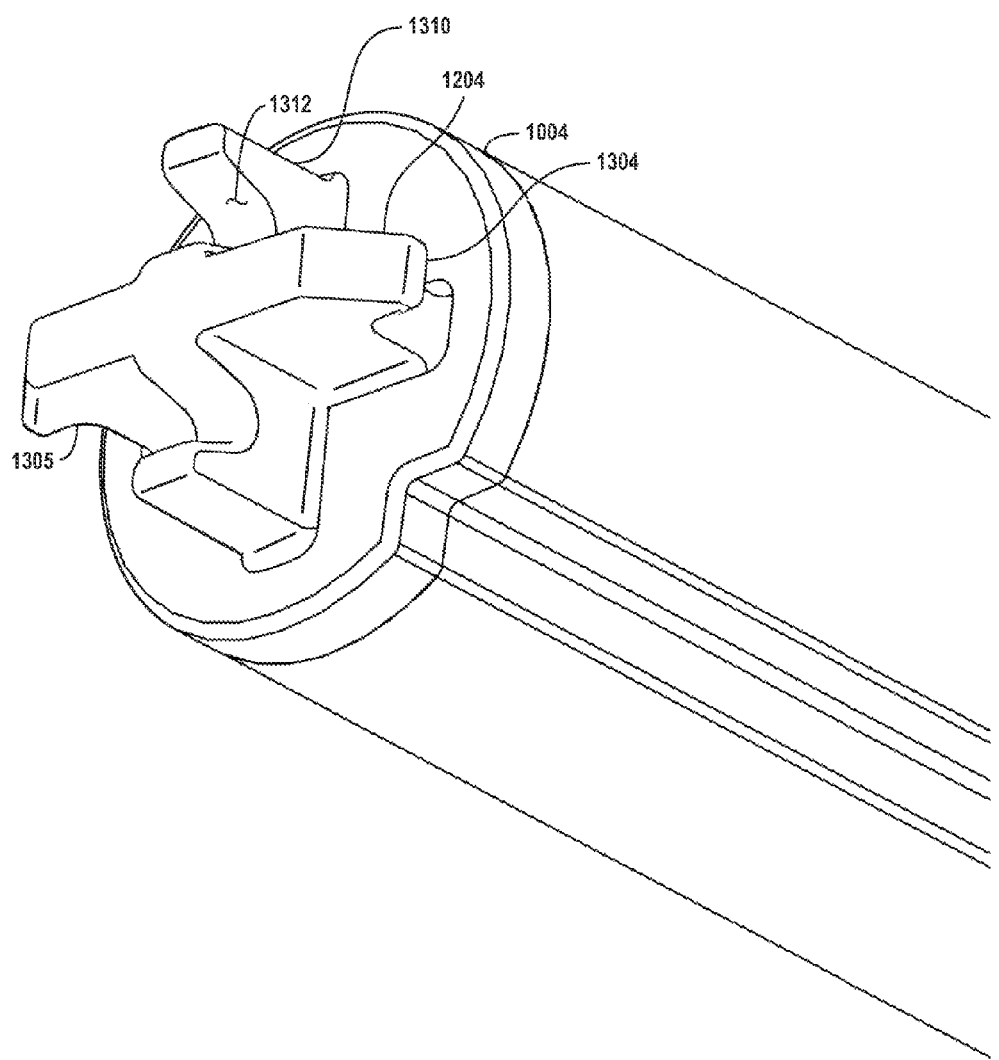
FIG. 13 is a perspective view of a front portion of the electrode of FIG. 10 prior to completing assembly.
Figure 14:
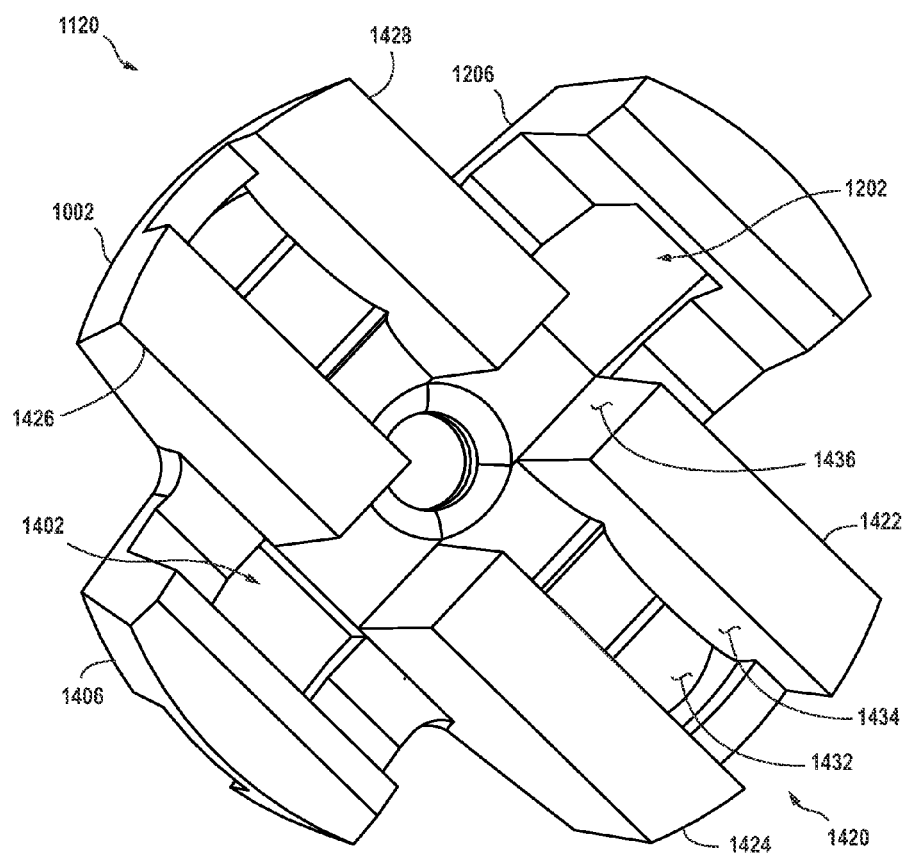
FIG. 14 is a perspective view of a rear portion of the electrode of FIG. 10 as seen prior to assembly onto the front portion of FIG. 13.

In the perspective rear view of assembled electrode 1000 of FIG. 12, filament 140 is shown threaded through opening 1220 with an exposed end 1003 trimmed flush to electrode 1000 after assembly of aft part 1002 and fore part 1004. Exposed end 1003 is positioned within a suitable distance for ionization to occur between exposed end 1003 and surface 1010 for propagation of current as discussed above. Aft part 1002 is formed of resilient material (e.g., plastic). Aft part 1002 includes latch arm 1206 and an identical second latch arm 1205 diametrically opposite latch arm 1206. Latch arm 1206 includes an opening 1202 that admits anvil 1204 of fore part 1004. When aft part 1002 and fore part 1004 are assembled, latch surface 1208 interferes with a forward surface (not shown) of anvil 1204 to retain aft part 1002 fixed to fore part 1004. Identical features and cooperation occur with respect to the second latch arm 1205 and a second surface (not shown) of anvil 1204.

Filament 140 is retained in a channel 1120 as discussed above and as illustrated in FIGS. 13 and 14. Channel 1120 is defined across a diameter of the electrode that includes opening 1220 through which filament 140 enters channel 1120. Channel 1120 is defined by irregular surface 1432 of aft part 1002 in cooperation with irregular surface 1312 that traverses base 1310, and a respective inner surface of each of barriers 1422, 1424, 1426, and 1428 all of fore part 1004. Base 1310 comprises the integral combination of a surface for retaining filament 140 and surfaces for latching aft part 1002 with fore part 1004. Anvil 1204 includes ends 1304 and 1305. Each latch arm 1206 (1406) is held by a surface (not shown) of anvil 1204 at an end 1304 (1305) of anvil 1204 to maintain the assembly of aft part 1002 and fore part 1004.

A barrier, according to various aspects of the present invention, defines a channel, assures proper assembly, and includes an irregular surface for retaining a filament. Aft part 1002 comprises four barriers 1422, 1424, 1426, and 1428 that are symmetrical and arranged about opening 1220. Each barrier provides surfaces with structure and functions analogous to surfaces 1434 and 1436 of barrier 1422. Barriers 1422 and 1424 define half channel 1420 of channel 1120. Filament 140 is shown in channel 1420 of FIG. 14. Filament 140 is retained in an analogous manner when located in half channel 1421 of channel 1120. Surface 1436 guides either end 1304 or 1305 of anvil 1204 into proper orientation for operation of latch arms 1206 and 1406. Surface 1434 prohibits filament 140 from leaving half channel 1420. Consequently, when latch arms 1206 and 1406 catch on anvil 1204 as discussed above, filament 140 must conform to irregular surfaces 1432 and 1312. Latch arms 1206 and 1406 and anvil 1204 are dimensioned so that surfaces 1432 and 1312 are separated by a distance suitable for retaining filament 140 under all conditions of electrode 1000 use including assembly, deployment, and impact with a target.

Examples of the Invention

A deployment unit for an electronic control device (ECD) used as a weapon provides a current from a signal generator of the ECD through tissue of a human or animal target. The deployment unit includes a housing, an interface, a filament, and an electrode. The interface couples the housing to the signal generator. The filament includes a first end coupled to the interface for receiving the current and comprises a second end. The filament conducts the current for inhibiting voluntary movement by the target. The electrode, stored in the housing prior to deployment, mechanically couples the filament to the target when deployed. The electrode includes an assembly of a first part and a second part that after assembly cooperate to bind the second end of the filament to the electrode.

A method for manufacturing an electrode for use by an electronic weapon, the method comprising assembling a filament, a first part, and a second part by latching the first part with the second part thereby binding the filament between the first part and the second part.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A deployment unit for providing a current from a signal generator through tissue of a human or animal target, the deployment unit comprising:
   a. a housing;
   b. an interface that couples the housing to the signal generator, the interface for receiving the current;
   c. a filament that conducts the current, the current for inhibiting voluntary movement by the target, the filament comprising a first end coupled to the interface for receiving the current and comprises a second end; and
   d. an electrode stored in the housing prior to deployment, the electrode for being mechanically coupled to the target when deployed, the electrode for providing the current through the tissue of the target; wherein
   e. the electrode comprises an assembly of a first part and a second part that after assembly cooperate to bind the second end of the filament to the electrode;
      the first part comprises a first latching surface; and
      the second part comprises a second latching surface to abut the first latching surface to maintain the assembly after deployment of the electrode.

2. The deployment unit of claim 1 further comprising a propellant that in operation propels the electrode away from the housing to deploy the filament toward the target.

3. The deployment unit of claim 1 wherein the filament is stored in the housing prior to deployment.

4. The deployment unit of claim 1 wherein at least one of the first part and the second part comprises a barrier to reduce a possibility of interference between the filament and at least one of the first latching surface and the second latching surface.

5. The deployment unit of claim 1 wherein at least one of the first part and the second part comprises a channel to reduce a possibility of interference between the filament and at least one of the first latching surface and the second latching surface.

6. The deployment unit of claim 1 wherein to complete the assembly, the first part and the second part require at least one bend in the filament that increases a binding effect of the assembly.

7. The deployment unit of claim 4 wherein the first part further comprises an integral spear.

8. The deployment unit of claim 1 wherein:
the electrode further comprises a spear; and
the second end after assembly is positioned apart from the spear.

9. The deployment unit of claim 1 wherein the first part further comprises an integral spear.

10. The deployment unit of claim 9 wherein the second end after assembly is positioned apart from the spear.

11. The deployment unit of claim 10 wherein the first part comprises a surface that supports propagation of the current from the second end toward the spear.

12. The deployment unit of claim 11 wherein the first part further comprises a shaft and the conductive exterior surface is overmolded onto the shaft.

13. The deployment unit of claim 1 wherein the first part comprises a surface that supports propagation of the current from the second end toward the target.

14. The deployment unit of claim 13 wherein the first part further comprises a shaft and the conductive exterior surface is overmolded onto the shaft.

15. A method for manufacturing an electrode for extending a filament from a signal generator that provides a current for involuntary muscle contraction in a human or animal target, for conducting the current through the filament and through tissue of the target, the filament comprising a first end and a second end, the electrode comprising a first part and a second part, the method comprising:
assembling the second end of the filament, the first part of the electrode, and the second part of the electrode by latching the first part with the second part so that the first part and the second part cooperate to bind the second end of the filament for extending the second end at the electrode away from the first end at the signal generator, and remain latched together while extending the filament.

16. The method of claim 15 wherein to accomplish latching:
a. an first axis of circular symmetry of the first part is aligned with a second axis of circular symmetry of the second part along an axis of alignment; and
b. at least one of the first part and the second part is moved along the axis of alignment.

17. The method of claim 15 further comprising conforming the filament to a surface irregularity of at least one of the first part and the second part.

18. The method of claim 15 further comprising threading the filament through an orifice of the first part before accomplishing latching.

19. The method of claim 15 trimming excess filament to expose a conductor of the filament at an exterior surface of the electrode.

\* \* \* \* \*